US012802017B2

(12) United States Patent
Issrani et al.

(10) Patent No.: US 12,802,017 B2
(45) Date of Patent: Nov. 17, 2026

(54) SMART ORCHARD HARVESTING CART WITH ANALYTICS

(71) Applicant: DEERE & COMPANY, Moline, IL (US)

(72) Inventors: Manoj Issrani, Pune (IN); Pradeep Kale, Parbhani (IN); Amit Wavhal, Pune (IN)

(73) Assignee: Deere & Company, Moline, IL (US)

( * ) Notice: Subject to any disclaimer, the term of this patent is extended or adjusted under 35 U.S.C. 154(b) by 1095 days.

(21) Appl. No.: 16/950,544

(22) Filed: Nov. 17, 2020

(65) Prior Publication Data

US 2022/0156670 A1 May 19, 2022

(51) Int. Cl.

| | |
|---|---|
| ***G06Q 10/0639*** | (2023.01) |
| ***B62B 5/00*** | (2006.01) |
| ***G06T 7/70*** | (2017.01) |
| ***G06T 7/90*** | (2017.01) |
| ***G06V 20/10*** | (2022.01) |
| ***G06V 20/68*** | (2022.01) |
| ***H04N 23/54*** | (2023.01) |

(52) U.S. Cl.

CPC ..... *G06Q 10/06398* (2013.01); *B62B 5/0026* (2013.01); *B62B 5/0096* (2013.01); *G06T 7/70* (2017.01); *G06T 7/90* (2017.01); *G06V 20/188* (2022.01); *H04N 23/54* (2023.01); *G06T 2207/10024* (2013.01); *G06T 2207/30242* (2013.01); *G06V 20/68* (2022.01)

(58) Field of Classification Search

None

See application file for complete search history.

(56) References Cited

U.S. PATENT DOCUMENTS 9,144,195 B2 * 9/2015 Koch ...................... G01F 25/14
9,292,853 B2 3/2016 Ascarrunz et al.
9,639,903 B2 5/2017 Rosa
(Continued)

FOREIGN PATENT DOCUMENTS

| | | | |
|---|---|---|---|
| AR | 108355 | A1 | 8/2018 |
| CL | 2018003246 | A1 | 12/2019 |
| KR | 101808428 | B1 | 12/2017 |

OTHER PUBLICATIONS

Galeas et al.. Smartbins: Using Intelligent Harvest Baskets to Estimate the Stages of Berry Harvesting. Sensors (Basel). Mar. 19, 2019;19(6):1361. doi: 10.3390/s19061361. PMID: 30893779; PMCID: PMC6471905 (Year: 2019).*
(Continued)

*Primary Examiner* — Chesiree A Walton

(57) ABSTRACT

An orchard harvesting cart with a receptacle, a position determining system, a load sensor, and at least one camera. As a plurality of harvested fruit items are collected and placed within a receptacle of the harvesting cart, image data from at least one camera is processed to evaluate at least one characteristic of the fruit items within the field of view of the camera including, for example, determining whether a harvested fruit item was ready for harvesting. The orchard harvesting cart also includes a position determining system and a load cell allowing the cart to monitor and detect when new fruit items are added to the receptacle and to correlate information determined by image analysis with geospatial locations in the orchard.

15 Claims, 10 Drawing Sheets

(56) References Cited

U.S. PATENT DOCUMENTS

| | | | | |
|---|---|---|---|---|
| 2005/0126144 | A1* | 6/2005 | Koselka | A01D 46/30 56/10.2 R |
| 2007/0185749 | A1 | 8/2007 | Anderson et al. | |
| 2008/0030320 | A1 | 2/2008 | Wilcox et al. | |
| 2018/0025480 | A1* | 1/2018 | Dingle | G01N 21/84 382/110 |
| 2018/0137357 | A1* | 5/2018 | Margalit | G06F 18/00 |
| 2021/0294337 | A1* | 9/2021 | Van Mill | G05D 1/0214 |

OTHER PUBLICATIONS

Ampatzidis et al., "Cloud-based harvest management information system for hand-harvested specialty crops," Computers and Electronics in Agriculture, 2016, vol. 122, pp. 161-167.
Ampatzidis et al., "Portable weighing system for monitoring picker efficiency during manual harvest of sweet cherry," Precision Agriculture, 2013, vol. 14, pp. 162-171.
Future Farming, "YieldTec robots to end labour shortages in orchards," <https://www.futurefarming.com/Machinery/Articles/2020/4/YieldTec-robots-to-end-labour-shortages-in-orchards-566635E/> web page publicly available at least as early as Apr. 7, 2020.
Galeas et al., "Smartbins: Using Intelligent Harvest Baskets to Estimate the Stages of Berry Harvesting," Sensors, 2019, vol. 19, pp. 1-14.
Robotics Business Review, "Tabletop Grapes to Get Picked by Robots in India, With Help From Virginia Tech," <https://www.roboticsbusinessreview.com/agriculture/tabletop-grapes-picked-robots-india-virginia-tech/> web page publicly available at least as early as May 31, 2018.
Tevel, "The best fruit pickers in the world, by Far," <https://www.tevel-tech.com/> web page publicly available at least as early as Jun. 24, 2020.
Tech Crunch, "Abundant's apple harvesting robots get their first commercial deployment," <https://techcrunch.com/2019/03/25/abundants-apple-harvesting-robots-get-their-first-commercial-deployment/?renderMode=ie11> web page publicly available at least as early as Mar. 25, 2019.
Fresh Plaza, "Apple-picking robots gear up for US debut in Washington state," <https://www.freshplaza.com/article/9176377/apple-picking-robots-gear-up-for-us-debut-in-washington-state/ > web page publicly available at least as early as Jan. 2, 2020.
Capital Press, "Robotic apple pickers make progress," <https://www.capitalpress.com/ag_sectors/orchards_nuts_vines/robotic-apple-pickers-make-progress/article_b1bd180e-1163-11ea-93ec-bf5cfc2aecf1.html > web page publicly available at least as early as Dec 5, 2019.
Moorehead et al., "Automating Orchards: A System of Autonomous Tractors for Orchard Maintenance," 2012, pp. 1-8.
NZ Herald, "Robotic hands gently snatch kiwifruit future," <https://www.nzherald.co.nz/business/robotic-hands-gently-snatch-kiwifruit-future/6Q5DJJ6GWB4UIM5W6ZISO264MU/ > web page publicly available at least as early as Jun. 14, 2017.

* cited by examiner

SMART ORCHARD HARVESTING CART WITH ANALYTICS

BACKGROUND

The present invention relates to devices for use in manual harvesting or crop (e.g., fruits) from an orchard.

SUMMARY

Orchard harvesting may be done manually and collected product (e.g., fruit/crop) is collected in small carts, open boxes, and/or baskets. The receptacle is moved through the orchard and stopped at multiple different locations where product is removed from the plant/tree by hand and then place in the receptacle. When the receptacle is full (or when the picking operation/shift is complete), it is returned to a location for sale, packaging, and/or shipping. However, during manual harvesting, a farmer is not able to collect complete and accurate information regarding the crop yield including, for example, how much crop is picked from each plant and at which time throughout the season. The farmer also has limited information available by which to evaluate labor efficiency.

In one embodiment, the invention provides an orchard harvesting cart system including an orchard harvesting cart with a receptacle, a position determining system, a load sensor, and at least one camera. The receptacle is configured to receive a plurality of harvested fruit items as the orchard harvesting cart s moved through an orchard. The position determining system is configured to generate a position output signal indicative of a geospatial position of the orchard harvesting cart and the load sensor is configured to generate a load output signal indicative of a weight of fruit items inside the mobile receptacle. An electronic controller processes image data from the at least one camera to quantify at least one characteristic of at least one fruit item in the field of view of the at least one camera. For example, the controller may be configured to determine, based on the image data, whether a harvested fruit item is ready for harvesting or was harvested prematurely based on the image analysis.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1A:
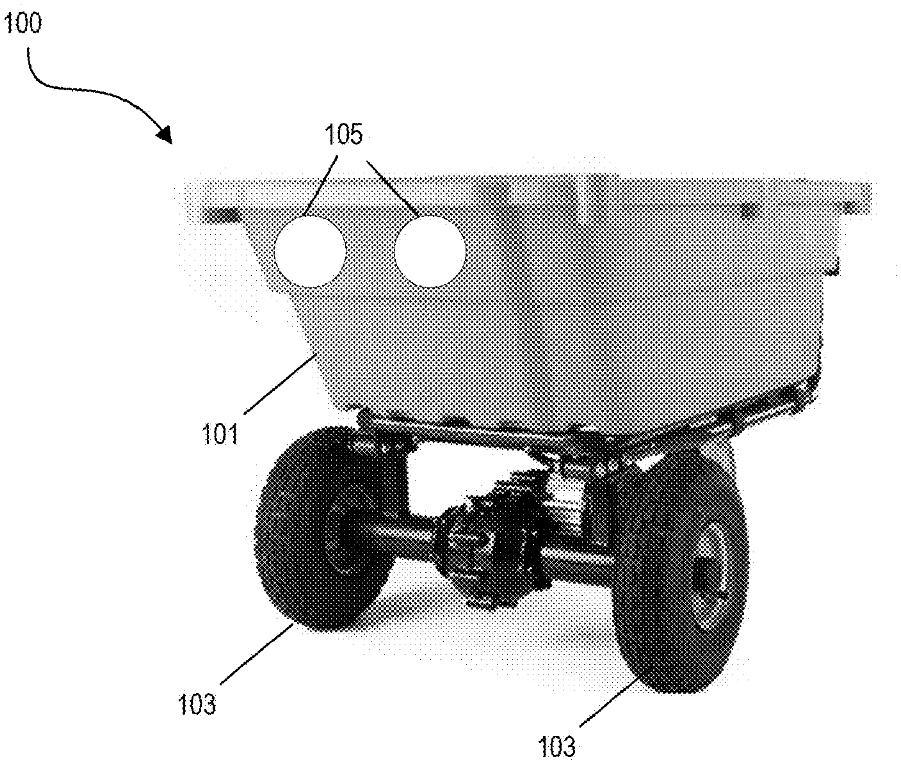
FIG. 1A is a perspective view of a harvesting cart according to one embodiment.
Figure 1B:
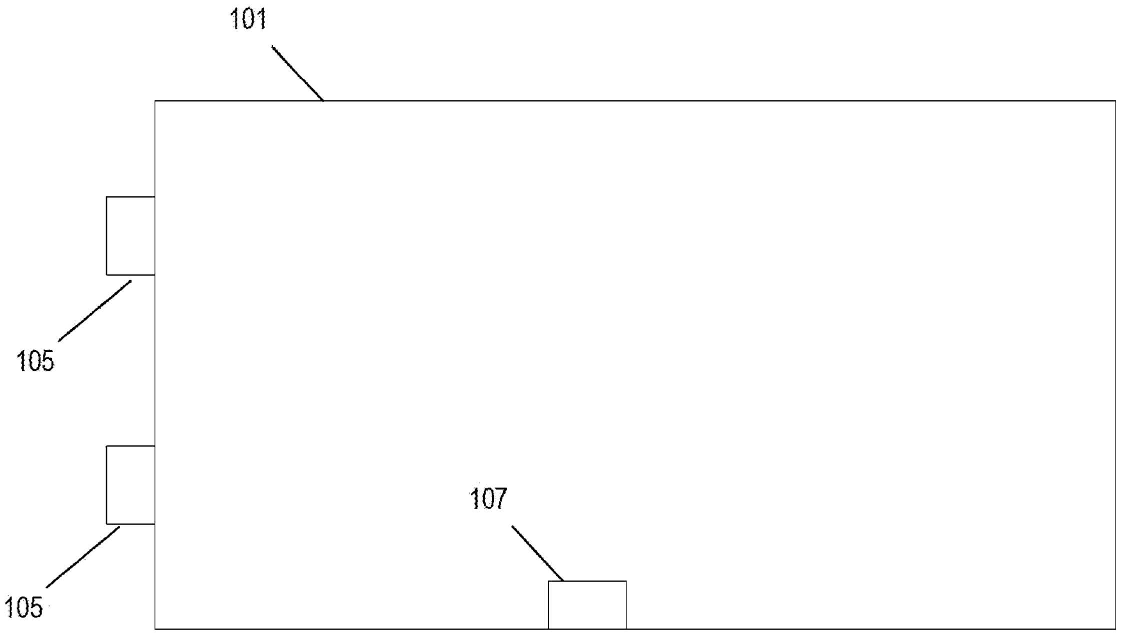
FIG. 1B is an overhead view of the harvesting cart of FIG. 1A.

FIGS. 1A and 1B illustrate an example of a harvesting cart 100 used for manual collection of product (e.g., fruit) in an orchard. For example, in an apple orchard, a worker will pull the harvesting cart 100 from tree-to-tree in the orchard, pick apples from the tree, and deposit the collected apples in the harvesting cart 100. When the harvesting cart 100 is full (or when the worker's shift is ended), the harvesting cart 100 is returned to a facility where the apples are unloaded from the harvesting cart 100 and packaged, stored, and/or prepare for transport. In various different implementations, the harvesting cart 100 may be pushed/pulled manually by a worker, pushed/towed by a vehicle, or configured with a motor to provide its own motive force. Additionally, even though the examples described herein focus primarily on a harvest cart 100, in some implementations, the systems and methods described herein may be provided in other type of receptacles including, for example, bins or bags worn or carried by a person or receptacles that are integrated into another system such as, for example, a fruit collection receptacle integrated into a vehicle.

As shown in FIG. 1A, the harvesting cart 100 of this example includes a receptacle 101 mounted on two or more wheels 103. The receptacle 101 has an internal volume that is enclosed on four-sides and the bottom leaving the top open to receive harvested fruit. One or more exterior cameras 105 are mounted on the harvesting cart 100. In the example of FIG. 1A, the exterior cameras 105 are positioned on the exterior of the receptacle 101, but, in other implementations, the exterior cameras 105 may be mounted elsewhere on the cart (for example, coupled to a body frame of the harvesting cart 100) in addition to or instead of the exterior cameras 105 mounted to the receptacle 101.

The exterior cameras 105 are configured with a field of view that will cause the exterior cameras 105 to capture image data including the trees as the harvesting cart 100 is moved through the orchard. For example, in some implementations, the harvesting cart 100 is moved from tree-to-tree in the orchard and stopped adjacent or below each tree as fruit is collected from that tree. Accordingly, in some implementations, the exterior cameras 105 may be positioned to capture image data above and to the side of the harvesting cart 100 so that, when the harvesting cart 100 is stopped at each tree, image data of the fruit bearing portion of the tree is captured by the exterior cameras 105.

The example of FIGS. 1A and 1B illustrates just one example of a placement, orientation, and configuration of the exterior cameras 105. For example, although FIGS. 1A and 1B show the exterior cameras 105 as a pair of cameras both mounted on a distal end of the harvesting cart 100, in other implementations, the exterior cameras 105 may be positioned on a proximal end of the harvesting cart 100 and/or on a side of the harvesting cart 100 in addition to or instead of the exterior cameras 105 mounted on the distal end as shown in FIGS. 1A and 1B. Furthermore, in the example of FIGS. 1A and 1B, the exterior cameras 105 are provided as a pair of exterior cameras configured for stereo vision to provide depth information in the captured image data. However, in other implementations, the harvesting cart 105 might include only a single exterior camera 105 or, in some implementations, multiple exterior cameras 105 each configured only for rectilinear imaging and not providing stereo vision imaging. Finally, in some implementations, one or more of the exterior cameras 105 may be configured to include a fish-eye lens to extend the field of view of the exterior camera 105.

As illustrated in the example of FIG. 1B, the harvesting cart 100 is also equipped with an interior camera 107 configured to capture image data of the collected fruit as it is deposited in the internal volume of the receptacle 101. Although the example of FIG. 1B shows only a single interior camera 107, in some implementations, the harvesting cart 100 is configured to include multiple interior cameras 107 including, for example, interior cameras 107 mounted at different heights and/or on different interior surfaces within the receptacle 101, and/or multiple interior cameras 107 configured to provide stereo vision imaging. Also, in some implementations, the interior camera 107 may be configured to include a fish-eye lens.

Figure 2:
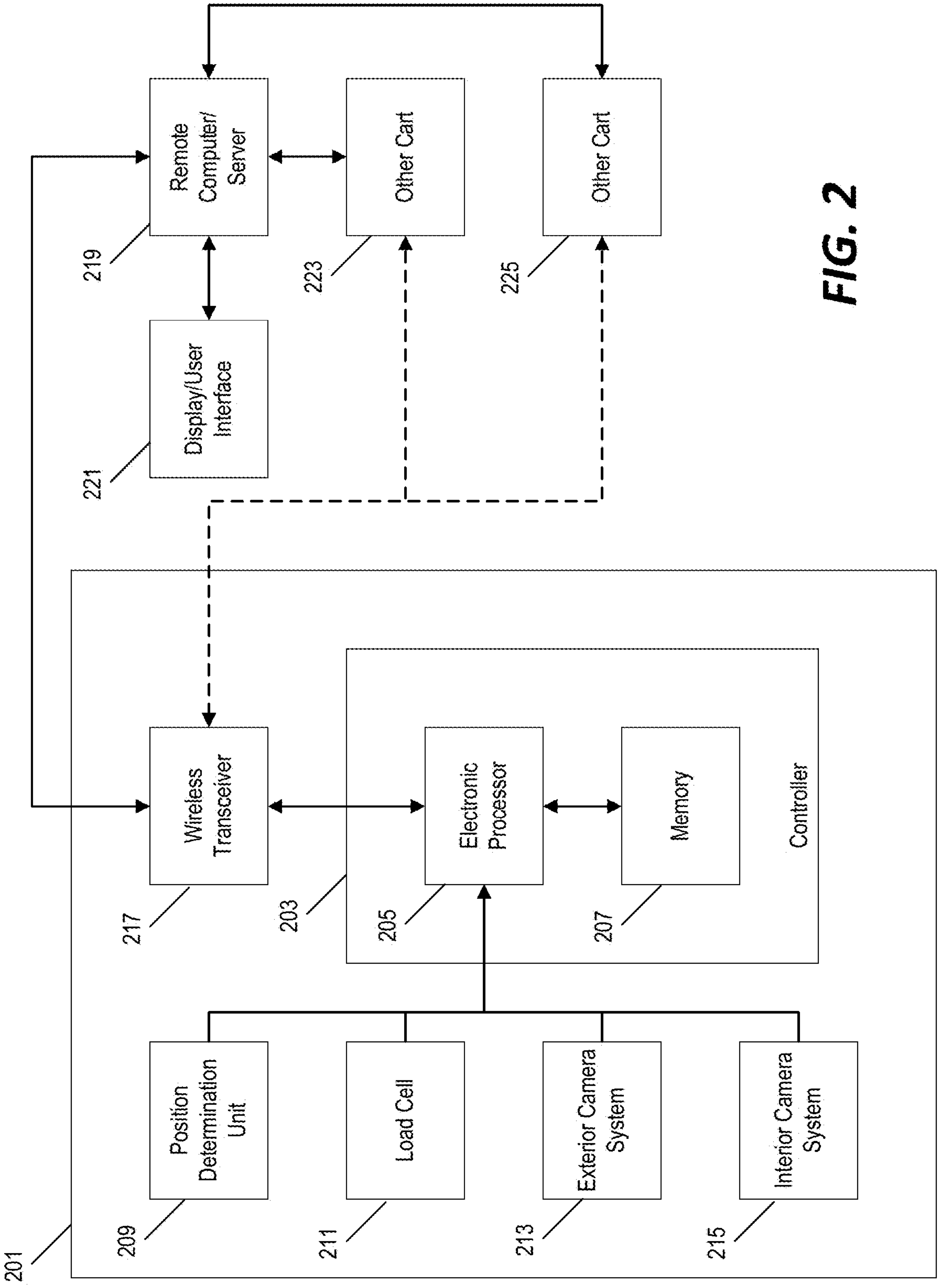
FIG. 2 is a block diagram of a control system for the harvesting cart of FIG. 1A.

In addition to being configured to capture exterior image data and interior image data, the harvesting cart 100 may be configured to capture other additional data during & after use, to communicate with other harvesting carts and/or a remote computer system/server, and to provide other functionality. FIG. 2 illustrates one example of a control system 201 for a harvesting cart 100.

The harvesting cart control system 201 includes a controller 203 with an electronic processor 205 and a non-transitory computer-readable memory 207. The memory 207 stores data (including, for example, image data captured by the cameras) and computer-executable instructions that are accessed & executed by the electronic processor 205 to provide the functionality of the harvesting cart control system 201 (such as, for example, the functionality described herein). The controller 203 is communicatively coupled to a position determining unit 209, one or more load cell 211, an exterior camera system 213, an interior camera system 215, and a wireless transceiver 217.

In some implementations, the position determining unit 209 may include, for example, a global positioning system (GPS) and/or a mechanism for determining position based on relative locations and/or distance of other systems/device (e.g., cellular phone antennas, mounted antennas, and/or other harvesting carts (as discussed in further detail below)). The controller 203 is configured to receive a signal from the position determining unit 209 indicative of a current geospatial position of the harvesting cart 100.

The harvesting cart 100 is configured with one or more load cells 211 positioned relative to the receptacle 101 and configured to generate an output signal indicative of a weight of the receptacle 101 and any objects placed therein. Accordingly, based on the signal received from the one or more load cells 211, the controller 203 is configured to determine a total weight of all fruit placed in the receptacle 101 and, in some implementations, may be configured to determine & track the weights of individual fruit items by monitoring changes in total weight as each individual fruit item is placed in the receptacle 101.

The exterior camera system 213 includes the one or more exterior cameras 105 and the interior camera system 215 includes the one or more interior cameras 107. Accordingly, the controller 203 is configured to receive exterior image data (e.g., image data including the fruit bearing portion of one or more trees) from the exterior camera system 213 and to receive interior image data (e.g., image data including the fruit items placed in the internal volume of the receptacle 101) from the interior camera system 215. As discussed in further detail below, the controller 203 is configured to process the exterior image data from the exterior camera system 213 to determine, based at least in part on the exterior image data, whether a particular tree in the orchard includes fruit that is ready for harvesting (i.e., ready to be picked). Additionally, the controller 203 is also configured to process the interior image data from the interior camera system 215 to determine, based at least in part on the interior image data, information about the fruit items that have been picked including, for example, a total number of fruit items picked, a number of fruit items that were picked pre-maturely (e.g., based on color analysis of each fruit item), and a specific type of fruit item picked (e.g., “Granny Smith” apples vs. “Fuji” apples).

Through the wireless transceiver 217, the controller 203 is able to communicate wirelessly with one or more external computer systems. For example, as illustrated in FIG. 2, the controller 203 may be configured to wirelessly communicate with a remote computer/server 219 either in real-time while the harvesting cart 100 is being used in the orchard or after the harvesting cart 100 is returned. In some implementations, the controller 203 is configured to compute various metrics and other data for fruit items collected in the harvesting cart 100 and to transmit those metrics and other data to the remote computer/server 219. In other implementations, the controller 203 may be configured instead to transmit raw data (e.g., the output signal of the load cell 211 and/or captured image data) to the remote computer/server 219 and the remote computer/server 219 is configured to process the received data to compute the various metrics. Accordingly, although some examples described herein may refer to methods performed by the controller 203, in other implementations, those methods (or parts of those methods) might instead be performed by the remote computer/server 219.

In various implementations, the data received by the remote computer/server 219 can be viewed for each individual harvesting cart 101 and/or aggregated with other collected metrics/data in order to display reports and mappings indicative of extended periods of time (e.g., an entire harvest season or multiple harvest seasons over multiple different years). These reports, maps, and, in some implementations, the source metrics, can be viewed by a user through a display/user interface 221 coupled to the remote computer/server 219. Additionally, as illustrated in FIG. 2, the remote computer/server 219 may be configured to communicate wirelessly with multiple different harvesting carts (e.g., other carts 223, 225 in FIG. 2) such that data received from each harvesting cart may be viewed/processed separately and/or aggregated with data received from other carts to provide more comprehensive information regarding the orchard. Also, in some implementations, the controller 203 is configured to wirelessly communicate with other carts (e.g., harvesting carts 223, 225) operating in the field.

In some implementations, in addition to conveying metrics and/or sensor data from the harvesting cart 100 to the remote computer/server 219, the controller 203 may also be configured to receive information and/or updated software/data from the remote computer/server 219 through the wireless transceiver 217. For example, as discussed further below, the controller 203 may be configured to periodically and/or occasionally receive updates from the remote computer/server 219 to the image processing routines used by the controller 203 to analyze image data captured by the cameras of the harvesting cart 100. In some implementations, the controller 203 is configured to periodically and/or occasionally perform a synchronization procedure in which data from the harvesting cart 100 is provided to the remote computer/server 219 and software updates are received from the remote computer/server 219. As discussed further below, in some implementations, this synchronization process may be configured to convey this exchange of data and software through cart-to-cart communication instead of or in addition to direct communication between the controller 203 and the remote computer/server 219.

Figure 3:
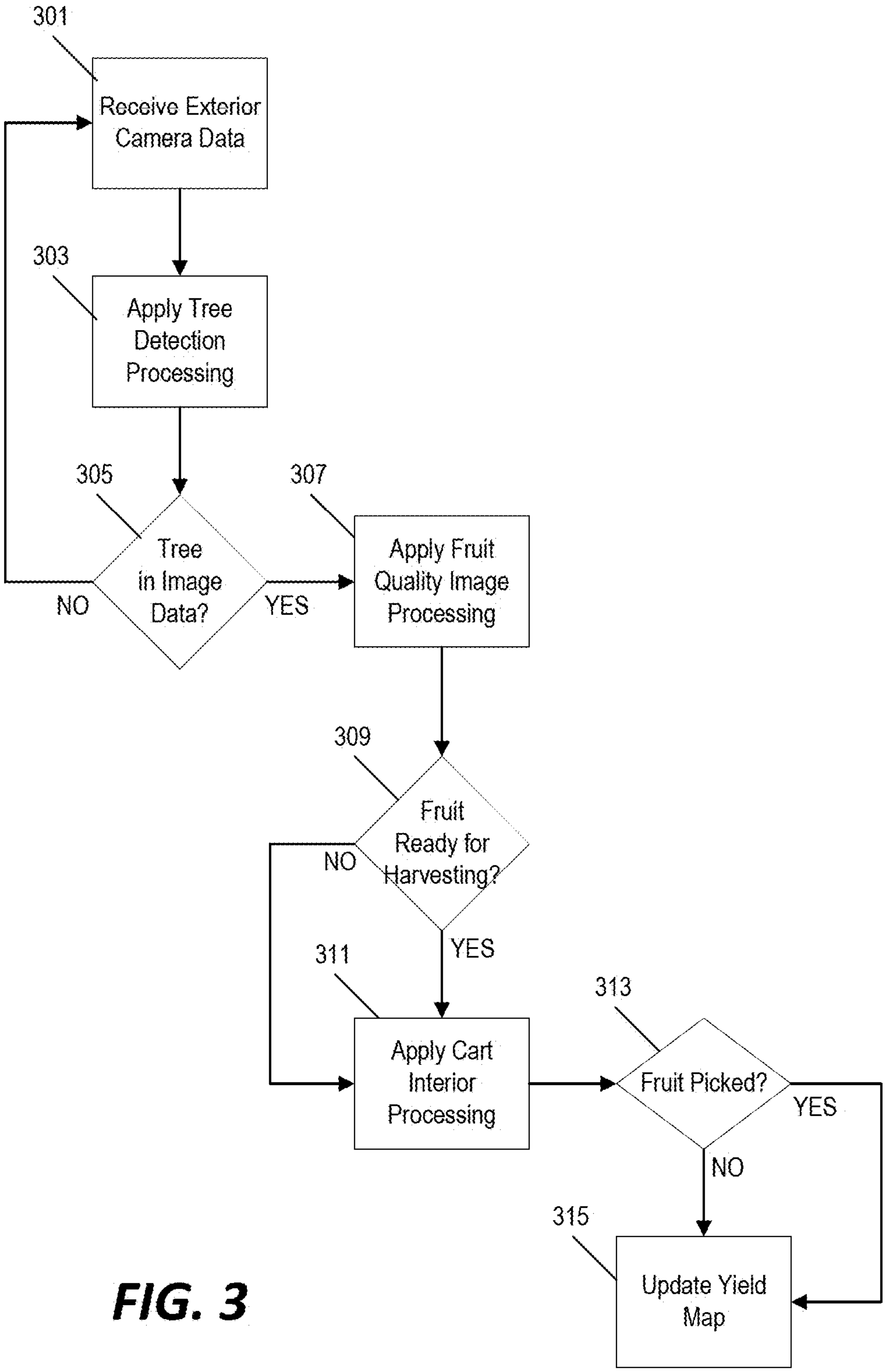
FIG. 3 is a flowchart of a method for generating yield map data based on image data captured by the harvesting cart of FIG. 1A.

FIG. 3 illustrates an example of a method performed using the harvest cart 100 of FIGS. 1A & 1B equipped with the control system 201 of FIG. 2 in order to collect image data and to generate a yield map based on the captured image data. Exterior image data is captured by the exterior camera system 213 (step 301) and a tree detection processing is applied (step 303) to detect whether a tree appears in the field of view of the exterior camera system 213 (step 305). If a tree is detected in the exterior image data, a second image processing is applied to evaluate the fruit quality of the fruit in the detected tree (step 307) and to provide an indication of whether the detected tree bears fruit that is ready for harvesting (step 309).

In some implementations, the tree detection processing may include, for example, an edge-finding software mechanism to detect an object in the field of view of the image data and then shape-based software analysis to determine whether the shape of the detected object indicates that the detected object is a tree. In some implementations, the fruit quality image processing may include, for example, a color-based image processing technique configured to evaluate the quality (i.e., readiness for harvest) of fruit in the tree based on the detected color in the exterior image data. For example, when the fruit being harvested is an apple variety that exhibits a bright red color when ready for harvesting, the fruit quality image processing mechanisms may be configured to generate a color histogram from the exterior image data and to evaluate the fruit quality (i.e., readiness for harvest) based on an amount of "red" detected in the exterior image data. In some implementations, the system is configured to apply the fruit quality image processing only to the portion of the image data corresponding to the location of a detected tree (e.g., as indicated by the output of the fruit detection processing).

Furthermore, in some implementations, the tree detection processing and/or the fruit quality image processing may include one or more artificial intelligence-based mechanisms (e.g., an artificial neural network) trained to receive image data as input and to produce an output indicative, for example, of whether a tree is detected in the field of view of the exterior camera system 213 and/or whether a detected tree bears fruit that is ready for harvest. In some implementations, an artificial intelligence mechanism may be trained to perform only the tree detection processing (e.g., receiving image data as input and producing as output an indication that a tree is detected in the image data and/or an indication of a detected location each tree in the image data) or only the fruit quality image processing (e.g., receiving as input the image data and/or an identification of a detected location of a tree from the tree detection processing and producing as output an indication of whether each detected tree has fruit that is ready for harvest). In other implementations, the tree detection processing and the fruit quality image processing are combined into a single artificial intelligence mechanism configured to receive image data as input and to produce as output an indication of the location of one or more individual trees and whether each detected tree has fruit that is ready for harvesting.

After the exterior image data processing is completed, the cart interior processing is applied (step 311) to detect when a fruit item is picked and placed in the harvesting cart (step 313). As discussed in further detail below, the cart interior processing may include, for example, an analysis of interior image data from the interior camera system 215 and/or an analysis of the output signal of the load cell 211 to detect when new additional fruit is introduced to the interior of the harvest cart receptacle 101.

As discussed above, the harvest cart control system 201 of FIG. 2 also include a position determining unit 209. Therefore, in addition to detect when each new fruit item is added to the receptacle (e.g., based on interior image data and/or the output signal of the load cell 211), the harvest cart control system 201 is also able to determine the location of the tree from which each fruit item is picked. For example, the when a worker stops to pick fruit from a particular tree, the harvest cart 100 will be stopped at or near the tree from which the worker is picking. Based on the captured exterior image data, the harvest cart control system 201 is able to detect that it has been positioned at a tree and, based on the output of the position determination unit 209, the harvest cart control system 201 is able to identify, a geospatial location of the tree at which the harvest cart 100 is currently placed. Accordingly, when each new fruit item is placed in the receptacle 101 of the harvest cart 100, the harvest cart control system 201 is able to infer the identity of the specific tree in the orchard from which that fruit item is picked based on the geospatial location of the harvest cart 100 and the detected location of the tree(s) in the field of view of the exterior image data when the fruit item was placed in the receptacle 101. Accordingly, the harvest cart control system 201 is able to generate a yield map (step 315) identifying a number of fruit items that are harvested from each individual tree in the orchard, the dates upon which the items were harvested, and (based on the identity of the worker assigned to each harvest cart 100) the identify of the worker that picked the fruit from that tree.

Figure 4:
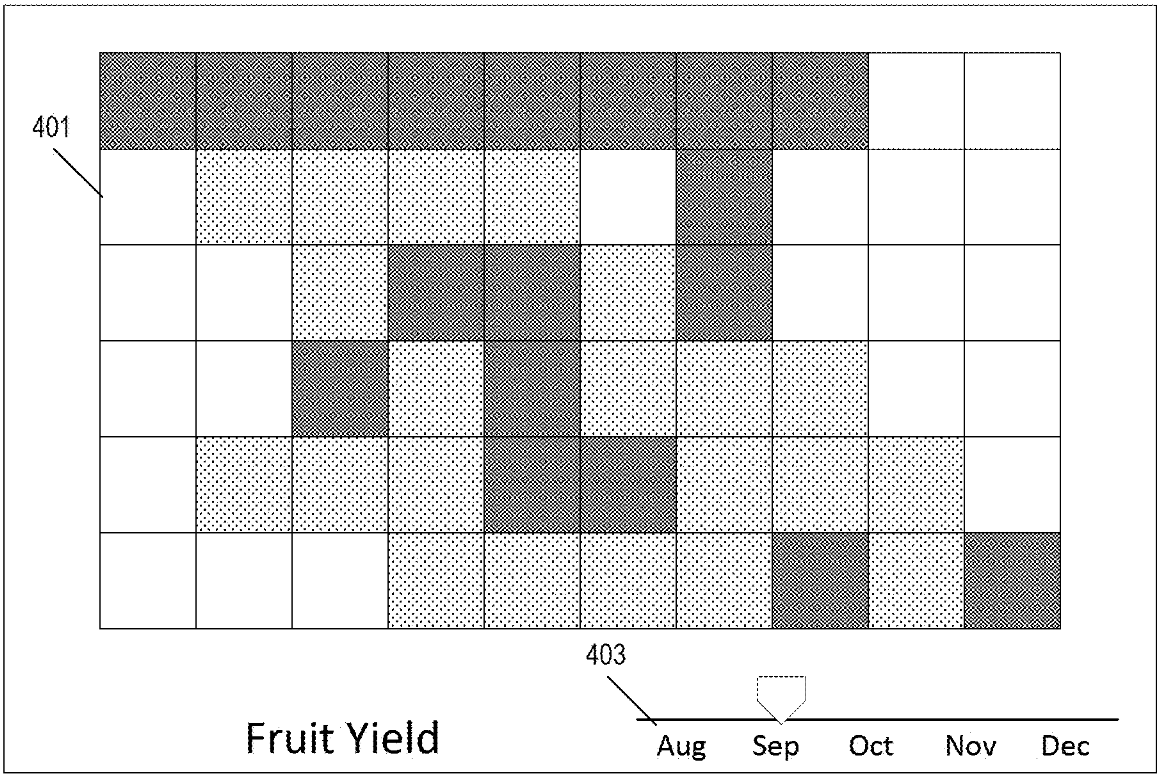
FIG. 4 is a graphical user interface displaying a “fruit yield” map for an orchard based on image data captured by the harvesting cart of FIG. 1A.

FIG. 4 illustrates an example of a yield map 401 that might be displayed, for example, on a display/user interface 221 of the remote computer/server 219. The yield map 401 in the example of FIG. 4 includes a plurality of individual squares each representing an individual tree in an orchard. Each square in the yield map is color coded to indicate a relative number of fruit items that have been harvested from each tree. For example, a darker color may indicate a larger number of harvested fruit items while a lighter color may indicate a smaller number of harvested fruit items. A graphical user interface displaying the yield map 401 may also include one or more user controls to adjust the information displayed on the yield map 401. For example, in FIG. 4, the graphical user interface also includes a slider-bar control 403 positioned below the yield map 401. The slider-bar control 403 can be adjusted to select a specific individual month during a harvest season and, in response to a selection indicated by the slider-bar control 403, the system is configured to update the yield map 401 to indicate the number of fruit items harvested from each individual tree the specific selected month. In other implementations, the user interface may include other controls including, for example, an additional slider-bar or drop-down selection list by which a user can select a particular worker from a list of workers that have picked fruit items in the orchard. When a particular worker is selected from the list, the system updates the displayed yield map 401 to indicate a number of fruit items picked from each individual tree by the specific worker.

Figure 5:
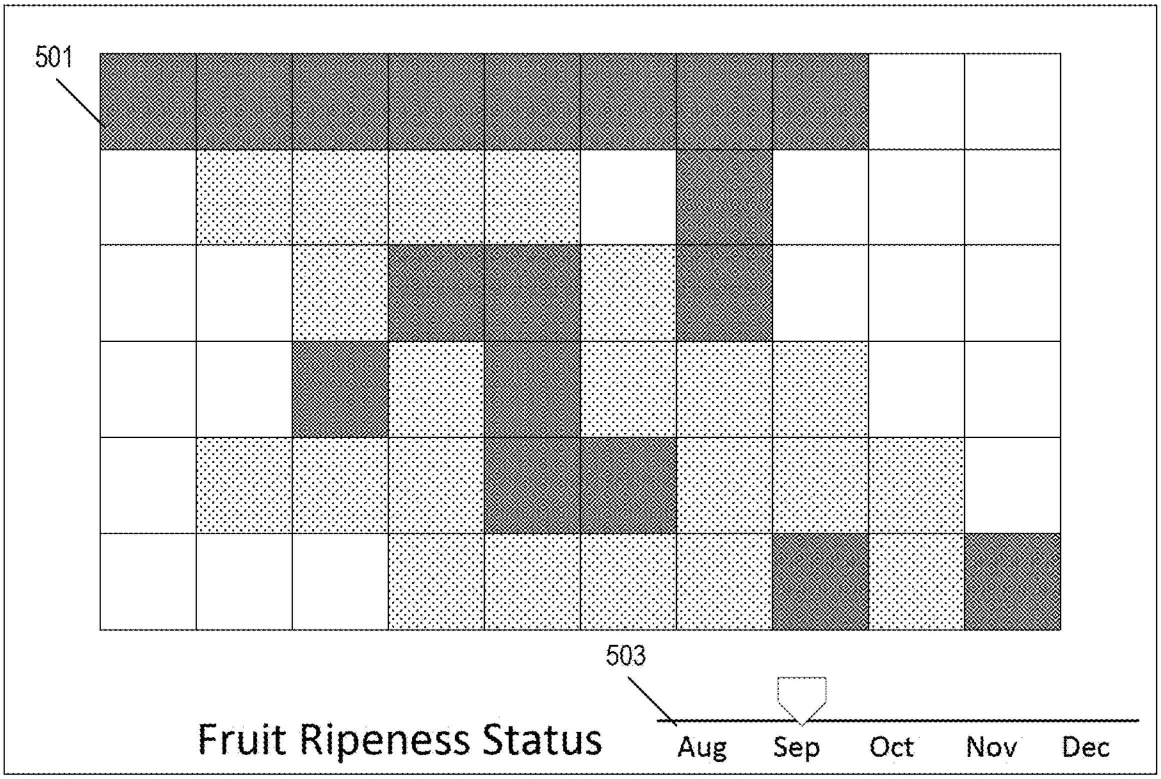
FIG. 5 is a graphical user interface displaying a “fruit ripeness” map for an orchard based on image data captured by the harvesting cart of FIG. 1A.

In some implementations, in addition to or instead of determining the number of fruit items harvested from each tree, the harvest cart control system 201 may be configured to generate other types of maps. For example, FIG. 5 illustrates a map fruit ripeness status map 501. By applying tree detection processing and fruit quality image processing to other trees within the field of view of the exterior camera system 213 when the harvest cart 100 is stopped and/or while the harvest cart 100 is in motion, the harvest cart control system 201 is able to determine whether other trees possess fruit that is ready for harvest and, by monitoring the position of the harvesting cart 100 and the stops made by the harvesting cart 100, whether the harvesting cart 100 was stopped at each identified tree for harvesting. Based on this information, the harvesting cart control system 201 identifies a relative amount of "ripe" fruit (i.e., fruit ready for harvesting) on each individual tree in the orchard that was passed by the harvesting cart 100—even for trees at which the harvesting cart was never stopped. Because a particular worker might not pass by each individual tree in the entire orchard, data collected by multiple different harvesting carts 100 and/or by multiple different workers on the same or different work shifts may be collected and aggregated to compile the fruit ripeness map 501 of FIG. 5.

Like in the example of FIG. 4, the graphical user interface displaying the fruit ripeness map 501 may also include one or more user input controls. The example of FIG. 5 illustrates a slider-bar control 503 that is operated by a user to select a particular month during the harvesting season. Based on the selected month, the system automatically updates the displayed fruit ripeness map to indicate a relative quantity of fruit 'ready for harvesting' on each individual tree in the orchard during that month. Although the example of FIG. 5 shows the slider-bar control 503 that only identifies each month, in other implementations, the time scale of the slider-bar control 503 (or other user input control) can be made more specific to enable a user to select a particular week or even a specific day during the harvest season.

Additionally, as discussed above in reference to the example of FIG. 4, the graphical user interface displaying the fruit ripeness map 501 can, in other implementations, include other user input controls in addition to or instead of the date selection slider-bar control 503. For example, the graphical user interface of FIG. 5 might also include a user input control for selecting a specific individual worker. In some implementations, the system might be configured to receive the selection of the specific worker and, in response, to update the fruit ripeness map to identify trees that possess fruit that was ready for harvesting, but were passed by the worker (i.e., "missed" fruit). In this way, the system is able to monitor worker performance, for example, based on total fruit picked by each worker and/or the total fruit picked by the worker as compared to the total amount of fruit in the orchard that was ready for harvesting.

Figure 6:
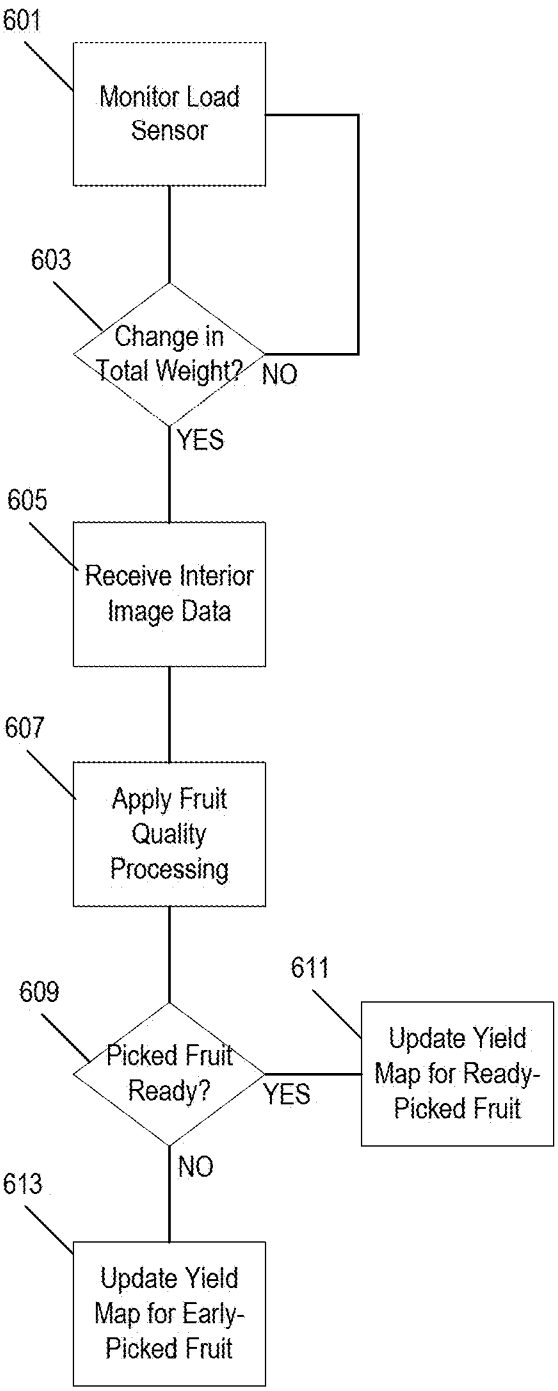
FIG. 6 is a flowchart of a method for evaluating harvested crop based on interior image data captured by the harvesting cart of FIG. 1A.

As discussed above in reference to FIG. 3, the harvest cart control system 201 is also configured to receive system data regarding the status of fruit placed within the interior receptacle 101 of the harvest cart 100. FIG. 6 illustrates an example of one such method for monitoring the collected interior data. The controller 203 monitors the output signal of the load cell 211 (step 601) and detects changes in the total sensed weight indicating that a new fruit item has been added to the receptacle (step 603). In response to detecting a new fruit item, the controller 203 accesses captured image data from the interior camera system 215 (step 605) and applies a fruit quality image processing (step 607) to determine whether the newly added fruit item was indeed ready for harvesting (step 609). In some implementations, the interior image-based fruit quality processing may include a color-based analysis of the image data configured to evaluate the relative "readiness" of the fruit item based on its color. In some implementations, the controller 203 is configured to apply the color-based analysis to the entire captured image and to determine a "readiness" of the newly added fruit item based on a detected change in the overall color of the interior image when the new fruit item is added to the receptacle 101. In other implementations, the controller 203 is configured to compare interior image data captured after the new fruit item is added with interior image data captured before the new fruit item is added in order to detect a location of the newly added fruit item in the subsequently captured image. In some such implementations, the color-based analysis to determine the 'readiness' of the newly added fruit item is applied only to the portion of the interior image data corresponding to the location of the newly added fruit item.

In this way, the harvest cart control system 201 is able to track not only a total number of fruit items picked by a worker and placed in the receptacle 101, but also a number of picked fruit items that were ready for harvesting and a number of fruit items that were picked prematurely. This data can be collected and stored for later use in evaluating worker performance. For example, yield maps might be generated by the system indicating a number and location of fruit items picked by the worker when they were ready for harvesting (step 611) and a number and location of prematurely-picked fruit items (step 613).

Figure 7:
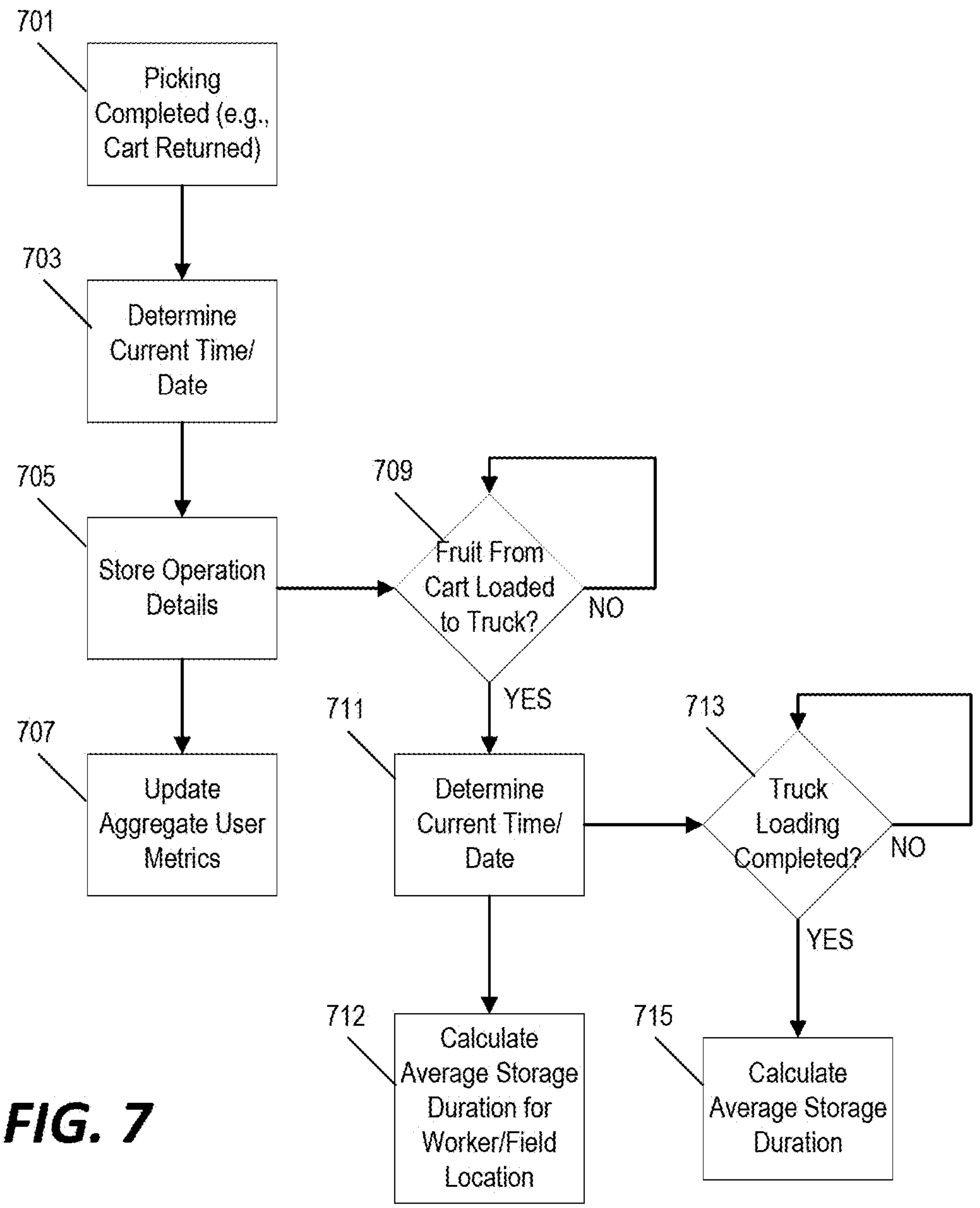
FIG. 7 is a flowchart of a method for calculating and evaluating durational metrics to quantify delays between harvesting of a crop from the orchard and processing (i.e., shipping, packaging, sale, etc.) of the crop based on data collected by the harvesting cart of FIG. 1A.

As discussed in the example above, information tracked and determined by the harvest cart control system 201 can be used to evaluate and monitor the current status of the fruit in the orchard and also the performance of workers in the orchard. However, information collected by the harvest cart 100 can also be used to monitor and evaluate other aspects of an orchard's harvesting and processing operations. For example, FIG. 7 illustrates an example of a method performed by the remote computer/server based on information and data received from one or more harvest carts 100.

As discussed above, the harvest cart control system 201 is able to detect when a new fruit item is added to the receptacle 101 of the harvest cart 100. Accordingly, by using an internal clock of the controller 203, the harvest cart control system 201 is also able to determine the time at which the fruit items currently held in the receptacle 101 were picked from the trees in the orchard. After a worker completes a shift or completely fill the receptacle 101 of a harvest cart 100, the harvest cart is returned to a facility for further processing of the harvested fruit (step 701). This may include, for example, packaging for sale and/or transportation to a customer or another sales location. The system is configured to determine the time/date at which the harvesting cart 100 is returned to the facility (e.g., the current time/date indicated by the internal clock of the controller 203 when the output of the position determining unit 209 indicates that the harvesting cart 100 is at the geospatial location associated with the return facility) (step 703).

Operation details collected by the harvesting cart 100 while being used by the worker are stored to the internal memory 207 of the harvest cart 100 and transmitted to the remote computer/server 219 (step 705). These operation details transmitted to the remote computer/server 219 may include, for example, the time at which the first fruit item was placed in the receptacle 101, the time at which the last fruit item was placed in the receptacle 101, the time at which the harvesting cart 100 was returned to the facility, the name of the worker using the harvesting cart 100, and/or the yield mapping data. Upon receiving the operation data, the remote computer/server 219 updates aggregate user metrics for the worker associated with the harvesting cart 100 (step 707) and/or updates the yield maps and any other data maps compiled for the orchard.

The harvesting cart control system 201 is configured to detect when fruit items from the receptacle 101 are being removed, for example, based on a reduction in the total weight sensed by the load cell 211. Accordingly, the harvesting cart control system 201 is able to determine when fruit items from the harvesting cart 100 are being transferred to truck for shipping (step 709). The system again determines the current time/date when fruit items are being removed from the harvesting cart 100 (step 711) and, based on this information, the harvesting cart control system 201 calculates the storage duration for the fruit items in the harvesting cart 100 (i.e., a difference between the time at which the last fruit item was added to the receptacle 101 and the time at which the fruit items were removed from the receptacle 101).

The storage duration information is transmitted to the remote computer/server 219 and aggregated to monitor/compute other metrics including, for example, an average storage duration for fruit picked from particular locations throughout the orchard and/or an average storage duration for fruit picked by a particular worker (step 712). This information may be used, for example, to generate additional maps that can be used to convey this information to a user and/or to identify possible improvements that can be made to the efficiency of the orchard operation. For example, if the system determines that, for a particular location in the orchard, the duration between fruit picking and unloading of the fruit item from the harvesting cart is significantly longer, the orchard operations may be adjusted accordingly (e.g., by adjusting the assigned routes that workers follow while picking fruit in the orchard or by facilitating expedited transportation of harvesting carts from that location to the cart-return facility).

In some implementations, the remote computer/server 219 is also configured to utilize aggregated information from multiple different harvest carts 100 to determine and track various metrics for fruit items harvested by multiple different workers. For example, each individual harvest cart control system 201 is configured to determine when the fruit items from the respective harvesting cart 100 is loaded onto a truck. As a truck is loaded with fruit items from multiple different harvesting carts 100, the overall system is able to determine and track a list of harvesting carts from which fruit items are included in the same shipment on the truck. Accordingly, when the truck loading is complete (step 713), the system is able to calculate an average harvesting time and/or an average storage duration for the entire truckload (step 715) based on the metric stored for each individual harvesting cart 100 from which fruit items were included in the particular truckload.

Using the method of FIG. 7 and/or similar aggregated metrics from multiple different harvesting carts 100 (and/or from multiple different uses of each individual harvesting cart 100), the system is able to monitor metrics for a particular individual worker, the entire overall orchard, and/or each separate shipment or other grouping of fruit items collected from multiple different harvesting cart loads.

Figure 8:
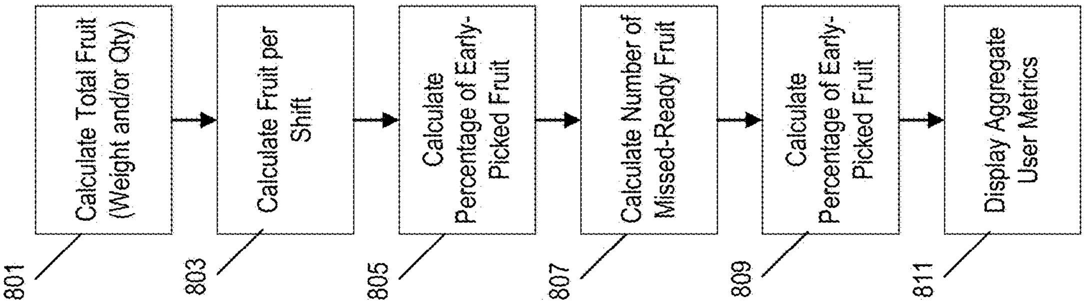
FIG. 8 is a flowchart of a method for determining worker efficiency metrics using the harvesting cart of FIG. 1A.

FIG. 8 illustrate an example of a method for monitoring performance metrics for a particular individual worker by aggregating data collected from multiple different uses of one or more harvesting carts 100. In some implementations, when a worker begins use of a harvesting cart 100, the harvesting cart control system 201 and/or the remove computer/server 219 is configured to identify the worker that is using the harvesting cart 100. For example, in some implementations, the harvesting cart 100 may include a user interface through which a worker is required to enter an identification (e.g., using a user ID code, an RFID tag, etc.) before operating the harvesting cart 100. In other implementations, a specific harvesting cart 100 may be assigned to each individual worker by the remote computer/server 219 and/or another worker scheduling system.

As discussed above, each harvesting cart control system 201 is able to monitor and track a total amount of fruit items in the harvesting cart by quantity of individual fruit items and/or a total overall weight of fruit items currently in the receptacle 101 of the harvesting cart 100 (step 801). In the example of FIG. 8, the remote computer/server 219 is configured to calculate an average amount of fruit harvested per shift by storing and aggregating this information for a particular worker across multiple work shifts and multiple harvesting cart uses, the remote computer/server 219 (step 803). Additionally, as discussed above in reference to FIG. 6, the harvesting cart control system 201 is also able to identify whether each picked fruit item added to the receptacle 101 is picked prematurely (based on the interior camera image data) and, as discussed above in reference to FIG. 5, whether the harvesting cart 100 passed by trees that had fruit ready for harvesting (based on exterior camera image data). Based on these collected and calculated metrics, the remote computer/server 219 calculates the amount of fruit picked prematurely (i.e., “early-picked” fruit) by each particular worker as a percentage of the total amount of fruit items picked by that particular worker (step 805). Similarly, the remote computer/server 219 calculates a number of missed-ready fruit for each worker (i.e., the number of trees with fruit ready for harvesting that were passed or “missed” by the worker while operating the harvesting cart 100). These aggregated metrics can then be displayed to an user (e.g., a person in charge of evaluating and/or scheduling workers in the orchard) to quantify worker performance and efficiency (step 811). In addition to evaluating individual worker performance, these metrics can also be used to ensure that a sufficient number of workers are scheduled to meet the workforce needs of the orchard.

As discussed above in reference to FIG. 3, in some implementations, the harvesting cart control system 201 is configured to use one or more artificial intelligence mechanisms (e.g., artificial neural network(s)) to determine fruit quality (i.e., readiness for harvesting) based on captured image data. "Readiness" of the fruit in the trees is determined based on an automated analysis of image data captured by the exterior camera system 213 and the "readiness" of fruit deposited in the receptacle 101 of the harvesting cart 100 is determined based on an automated analysis of image data captured by the interior camera system 215. For a variety of different reasons, one of these image processing techniques may be more accurate than the other. For example, in some implementations, the interior image processing mechanism may be better able to accurately identify the "readiness" of the fruit because the newly added fruit items are unobstructed when added to the receptacle 101 while fruit that it hanging in the tree may be at least partially obstructed by the leaves and branches of the tree. Accordingly, in some implementations, the harvesting cart control system 201 may be configured to retrain one artificial intelligence mechanism based on the output of the other.

Figure 9:
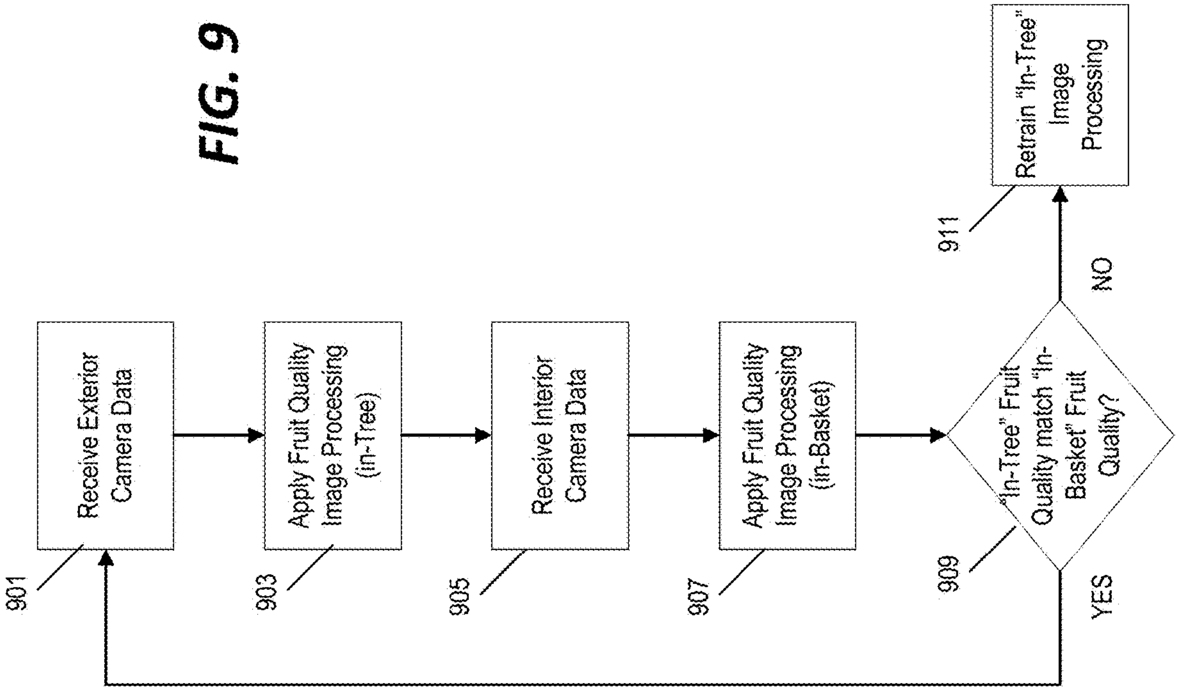
FIG. 9 is a flowchart of a method for retraining a machine-learning mechanism for determining whether a tree has fruit that is ready for picking using image data captured by the harvesting cart of FIG. 1A.

In the example of FIG. 9, the AI mechanism for evaluating the readiness of fruit in the tree(s) based on the exterior image data is retrained based on the output of the mechanism for determining the readiness of fruit in the receptacle 101 based on the interior image data. As exterior image data is captured by the exterior camera system 213 (step 901), the fruit quality image processing is applied (step 903) to determine a quantity or other metric indicative of an amount of fruit items in the tree that are ready for harvesting. As fruit items are harvested from the tree and placed in the receptacle 101 of the harvesting cart 100, interior image data is received (step 905) and image processing is applied to determine the quality (i.e, readiness for harvesting) of the fruit items added to the receptacle 101 (step 907).

After harvesting of fruit items from a particular tree is completed (i.e., when the harvesting cart 100 is moved after a period of remaining stationary near a tree), the output of the exterior camera "fruit quality" image processing is compared to the output of the interior camera "fruit quality" image processing. For example, in some implementations, the harvesting cart control system 201 determines whether the number of "harvest ready" fruit items added to the receptacle 101 from the particular tree (as determined based on the interior camera "fruit quality" image processing) matches the indication of "harvest ready" fruit items in the tree as determined based on the exterior camera fruit quality image processing (step 909). If the quantities match, then the exterior camera "fruit quality" image processing AI is not retrained. However, if the metric do not match, then then exterior camera "fruit quality" image processing AI is retrained based at least in part on the number of fruit items that were added to the receptacle from a particular tree that were determined to be "harvest ready" by the interior camera "fruit quality" image processing AI.

To provide for this type of aggregation of collected data, the harvesting cart 100 is configured to communicate with the remote computer/server 219. In some implementations, this transmission of recorded/tracked data might occur through a wired connection (for example, by coupling the harvesting cart control system 201 controller to a wired communication port by "docking" the harvesting cart 100 when it is returned after use). However, in other implementations, as discussed above in reference to FIG. 2, the harvesting cart control system 201 includes a wireless transceiver 217 to facilitate wireless communication with the remote computer-server 219 and, in some implementations, with other harvesting carts. In some implementations, this communication between the harvesting cart control system 201 and the remote computer/server 219 is a one-way communication in which operation data recorded during the use of the harvesting cart 100 is transmitted to the remote computer/server 219. In other implementations, there is a two-way communication in which operation data from the harvesting cart 100 is transmitted to the remote computer/server 219 and updated data and/or software is transmitted back to the harvesting cart 100 from the remote computer/server 219. For example, in some implementations, a synchronization operation between the harvesting cart control system 201 and the remote computer/server 219 may provide updated software to the harvesting cart control system 201 including, for example, a retrained AI mechanism for tree detection and/or fruit quality analysis. Additionally or alternatively, in some implementations, the harvesting cart 100 may be further equipped with display screen configured to display to the worker metrics regarding the amount of fruit "ready for harvesting" in each tree. This information may be determine based on exterior camera image data collected and processed by other harvesting carts operating in the orchard (as discussed above) and provided to the harvesting cart 100 as a "real-time" fruit ripeness map that can be used by the worker to determine which trees should be picked.

Figure 10:
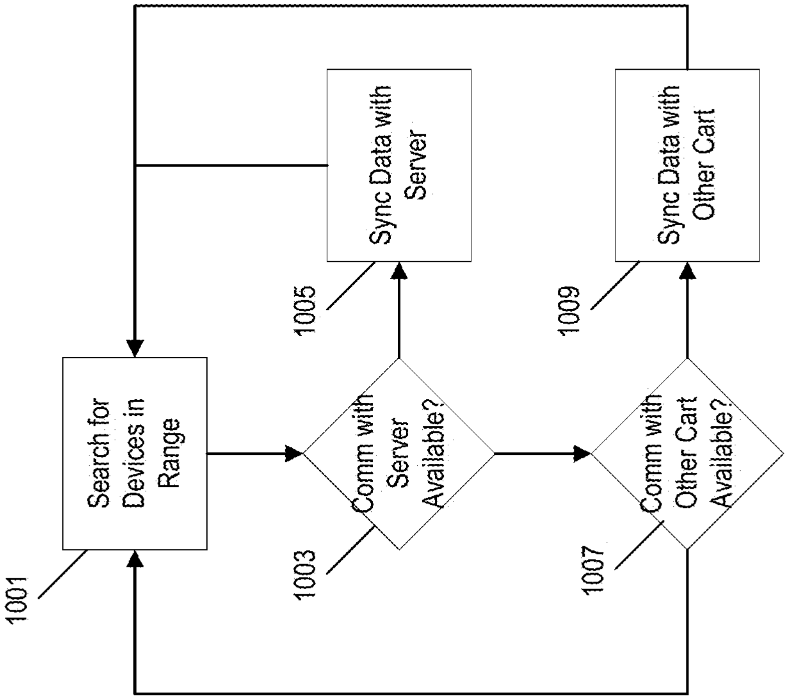
FIG. 10 is a flowchart of a method for synchronizing data between a plurality of harvesting carts and a remote server.

In some implementations, this two-way communication of data (e.g., synchronization) is performed directly between each harvesting cart 100 and the remote computer/server 219. However, in other implementations, synchronization may be performed between two harvesting carts in situations where direct communication with the remote computer/server 219 is unavailable. FIG. 10 illustrates an example of one such synchronization method. The harvest cart control system 201 searches for devices in range for wireless communication (step 1001). If direct communication with the remote computer/server 219 is available (step 1003), the harvesting cart control system 201 establishes communication with the remote computer/server 219 and performs a data synchronization directly with the remote computer/server 219 9step 1005). However, if direct communication with the remote computer/server 219 is not available, but wireless communication with another harvesting cart is available (step 1007), the harvesting cart control system 201 will establish communication with the other harvesting cart and perform a data synchronization with the other harvesting cart (step 1009).

In the method of FIG. 10, data from the harvesting cart 100 will be conveyed to the remote computer/server 219 either (a) when the harvesting cart 100 moves into a location where direct communication with the remote computer/server 219 is available or (b) when the other harvesting cart performs a data synchronization with the remote computer/server 219. Similarly, when the harvesting cart 100 is operating in a location where direct communication with the remote computer/server 219 is unavailable for an extended period of time, updated software/data from the remote computer/server 219 can still be conveyed to the harvesting cart control system 201 through the cart-to-cart synchronization of FIG. 10.

As discussed above in reference to FIG. 2, the harvesting cart control system 201 includes a position determination unit 209. In some implementations, the position determination unit 209 includes a GPS receiver configured to determine a geospatial location of the harvesting cart 100 by communicating with satellites. In other implementations, the position determination unit 209 may be configured to determine the location of the harvesting cart 100 based on other sensors or signals. For example, in some implementations, the position determination unit 209 includes one or more inertial movement unit (IMU) sensors and the harvesting cart control system 201 is configured to track a geospatial location of the harvesting cart 100 by determining movements of the harvesting cart 100 (based on the output of the IMU) from a known origin location. In other implementations, the harvesting cart control system 201 is configured to determine a location of the harvesting cart 100 by determining its location relative to one or more other harvesting carts operating in the same orchard, for example, using triangulation. In still other implementations, the harvesting cart control system 201 is configured to determine a current geospatial location of the harvesting cart 100 based on a combination of different sensors and mechanism.

Figure 11:
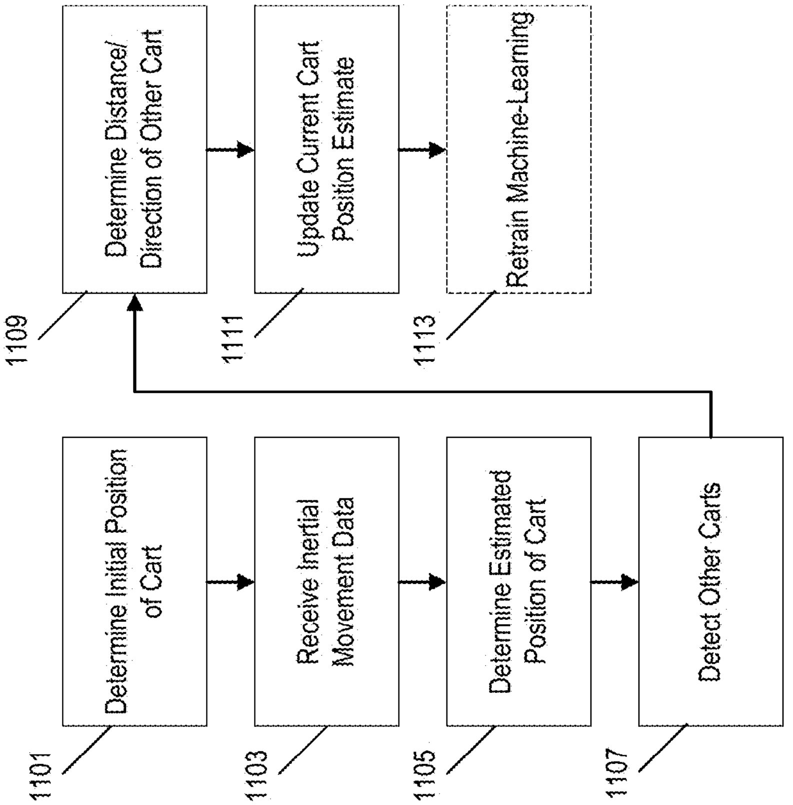
FIG. 11 is a flowchart of a method for determining a position of the harvesting cart of FIG. 1A based on a detected relative location of other harvesting carts.

FIG. 11 illustrates an example of a method by which a harvesting cart control system 201 is configured to track its own geospatial location based on the output signal of one or more IMU sensors and to confirm/validate the current geospatial location of the harvesting cart by triangulation with other harvesting carts operating in the orchard. An initial position of the cart is determined (e.g., a known "parking spot" or "docking station") (step 1101). As the harvesting cart 100 is moved into the orchard for use, the output signal of the IMU sensor(s) is monitored (step 1103) and the harvesting cart control system 201 determines an updated estimated position of the harvesting cart 100 based on the sensed movement (from the IMU sensor output) relative to the previously determined/known location (step 1105). For example, when the output of the IMU sensor(s) indicates that the harvesting cart has moved straight in the forward direction for 10 meters since the last known/determined position of the harvesting cart, the harvesting cart control system 201 determine that the current geospatial location of the harvesting cart 100 is 10 meters from the previous known/determined position.

The estimated geospatial position of the harvesting cart 100 can then be confirmed/validated by triangulation with other harvesting carts operating in the orchard. The harvesting cart control system 201 detects other harvesting carts within wireless communication range of the harvesting cart 100 (step 1107) and, using the wireless transceiver 217 or another relative position determining mechanism, determines an angular position of each other harvesting cart relative to the harvesting cart 100 and/or a distance between the harvesting cart 100 and each of the other harvesting carts (step 1109). In some implementations, each harvesting cart 100 is configured to transmit an indication of its current estimated geospatial location when the harvesting carts establish communication with each other (e.g., for the purposes of validating the tracked geospatial location) and/or when the geospatial location is requested by another harvesting cart.

Based on the estimated geospatial location of each of the other harvesting carts (as received from each of the other harvesting carts) and the determined angular position/distance of each of the other harvesting carts relative to the harvesting cart 100, the harvesting cart control system 201 calculates an updated geospatial position of the harvesting cart 100 using triangulation (step 1111). In some implementations, the harvesting cart control system 201 is configured to use this triangulated geospatial location as a new known origin point for further geospatial tracking based on the output signal from the IMU sensor. In other implementations, where the harvesting cart control system 201 is configured to estimate its current geospatial location using an AI mechanism configured to receive MU sensor signals as input and to produce an updated geospatial location as its output, the harvesting cart control system 201 may be further configured to retrain the AI position-determining mechanism based on the triangulated geospatial location determined based on the communications with the other harvesting carts operating in the orchard (step 1113).

Figure 12:
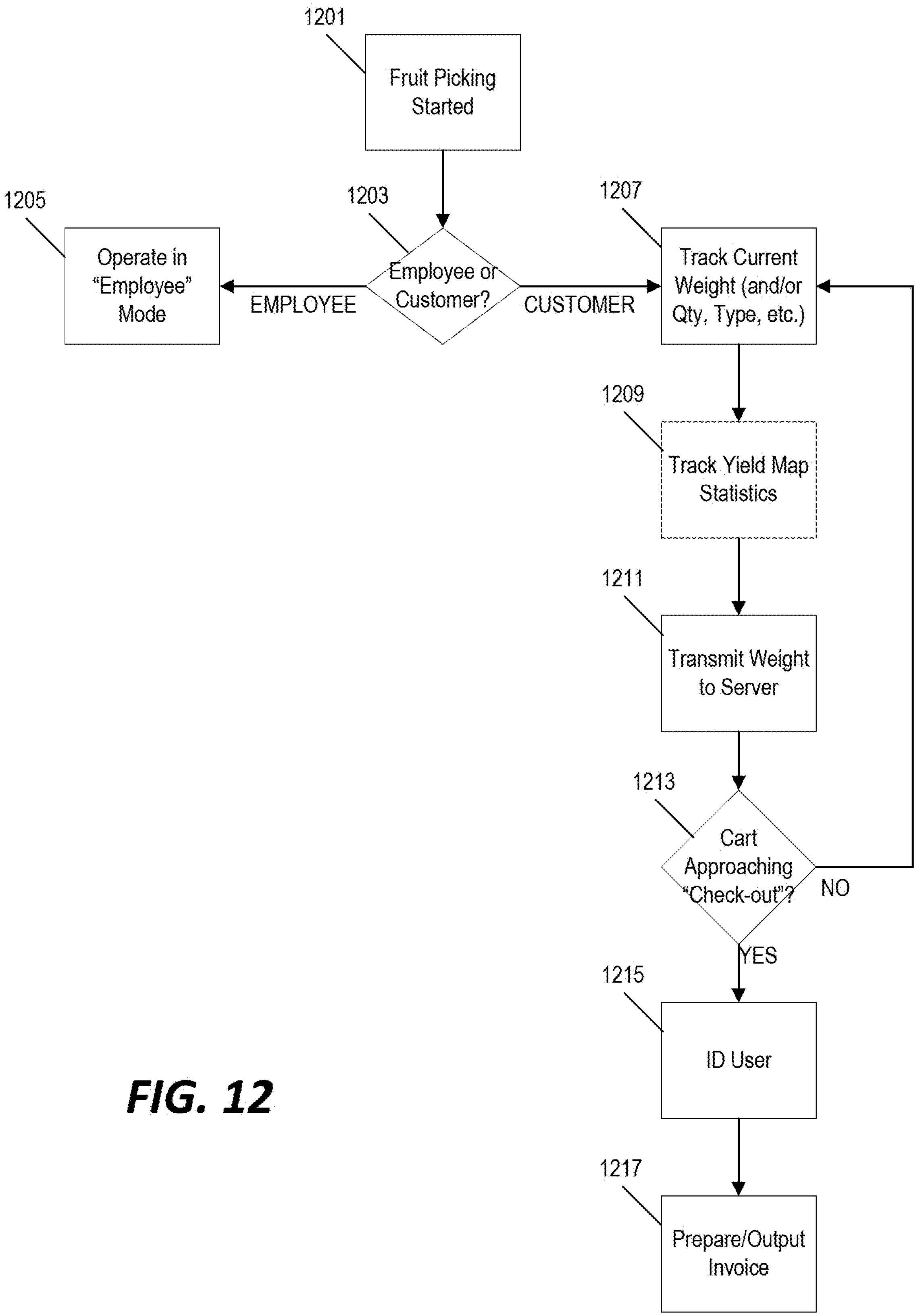
FIG. 12 is a flowchart of a method for selectively operating the harvesting cart of FIG. 1A for use by both employees and customers.

Some of the examples discussed above refer to situations in which the harvesting cart 100 is operated by a worker employed by the orchard. However, in some implementations, mechanism described above (including, for example, the yield mapping and "fruit ripeness" tracking) may also be utilized in situations where a customer picks apples for purchase directly from the trees in the orchard. In some such implementations, the harvesting cart control system 201 may be configured to operate differently depending on whether the harvesting cart 100 is being used by an employee/worker or by a customer. FIG. 12 illustrates one example of a method implemented by the harvesting cart control system 201 to selectively operate in a "customer" mode.

When the fruit picking session is started (step 1201), the harvesting cart control system 201 determines whether the harvesting cart 100 is being used by an employee/worker or by a customer (step 1203). This determination can be made, for example, by receiving a signal from the remote computer/server 219 or by selecting an operating mode by providing an input directly on the harvesting cart 100 (e.g., a signal from a mechanical switch). If the harvesting cart control system 201 determines that the harvesting cart 100 is being used by an employee/worker, the harvesting cart control system 201 operates in an "employee" mode (step 1205) which may include, for example, functionality discussed above for tracking metrics relating to worker performance and efficiency. However, if the harvesting cart control system 201 determines that the harvesting cart 100 is to be used by a customer, some of the collected metrics may be different. For example, the internal sensors and imaging hardware of the harvesting cart 100 may be used to make invoicing and purchasing more efficient for the customer.

In the example of FIG. 12, when operating in the "customer" mode, the harvesting cart control system 201 tracks the current contents of the receptacle 101 of the harvesting cart 100 including, for example, the current weight of fruit in the receptacle 101, the quantity of fruit items placed in the receptacle 101, and, in some case, an identification of the type of fruit items placed in the receptacle 101 (step 1207). In some implementations, the data collected by the harvesting cart control system 201 is used to track and update the yield mapping and statistics for the orchard such as described in the examples above (step 1209). In some implementations, the weight/quantity/type information for the fruit items that have been placed in the receptacle by the customer is transmitted to the remote computer/server 219 (step 1211) periodically while the customer is still picking fruit items in the orchard. When the system determines that the harvesting cart is approaching a "check out" location (e.g., based on the output of the position determination unit 209) (step 1213), the identity of the customer currently associated with the harvesting cart 100 is determined (step 1215) and an invoice is prepared for the identified customer based on the detected/tracked contents of the harvesting cart 100 (step 1217).

In some implementations, the system may be configured to collect identification and bank information (e.g., a credit card number) from each customer before they begin picking fruit items from the orchard so that the customer can be billed automatically when they complete their collection of fruit items that they'd like to purchase. In other implementations, a bill/invoice is prepared for the customer automatically and is presented to the customer for payment upon their return to the "check out" location.

Figure 13:
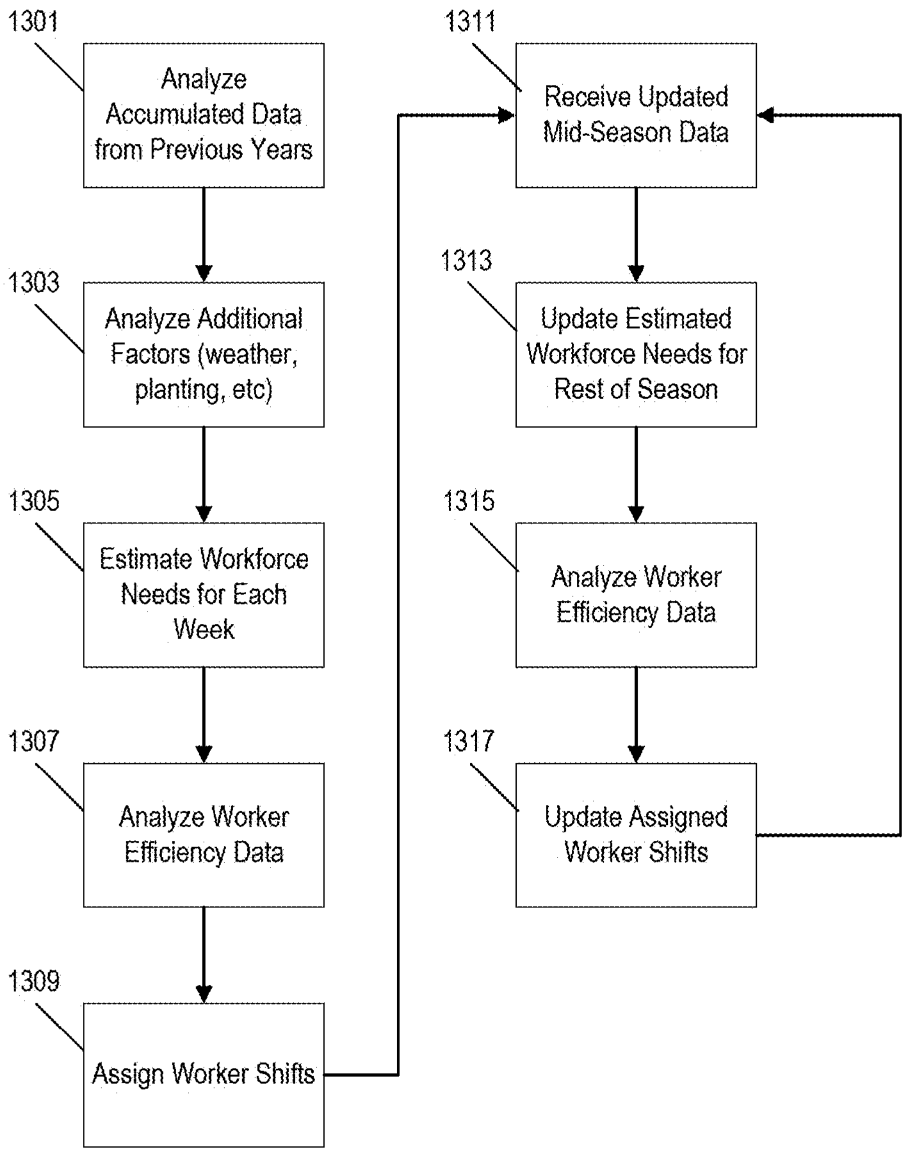
FIG. 13 is a flowchart of a method for predicting crop yield and workforce needs based on data collected by the harvesting cart of FIG. 1A.

Finally, in some implementations, the remote computer/server 219 is configured to use aggregated data collected by one or more harvesting carts 100 across multiple different uses from a current harvesting season and/or aggregated data from one or more previous harvesting season in order to predict workforce needs. FIG. 13 illustrates an example of one such method for using aggregated data collected by one or more harvesting carts 100 to assign scheduled workers during a harvesting season. Accumulated data collected by the harvesting cart(s) 100 during previous years is analyzed (step 1301) as well additional data regarding factors that may influence the orchard yield (e.g., weather, planting, etc.) (step 1303). Based on this information, the remote computer/server 219 estimates workforce needs for each week (or, in some implementation, for each day) during the upcoming harvest season (step 1305). In some implementations, this estimated workforce needs is determined using a trained AI mechanism (as discussed in further detail below).

Once the estimated workforce needs are determined, the remote computer/server 219 begins to assign worker to shifts. First, the remote computer/server 219 accesses and analyze worker efficiency data aggregated based on information collected by the harvesting cart(s) 100 during previous usage (step 1307) and assigns worker shifts to meet the workforce needs based on the determined efficiency/capabilities of each available worker (step 1309).

Other factors throughout the harvesting season can influence and change the workforce needs as the season progresses. Accordingly, in some implementations, the remote computer/server 219 continues to collect updated data throughout the harvesting season (step 1311) including, for example, yield map data indicating a quantity of fruit items harvested from each tree in the orchard, fruit ripeness maps indicating the current readiness of picking of fruit items in trees throughout the orchard, changes in weather patterns, and changes in worker efficiency. The remote computer/server 219 processes this data to update the estimated workforce needs for the rest of the harvest season (step 1313), continues to analyze worker efficiency based on data collected by the harvesting cart(s) 100 (step 1315), and updates/changes assigned worker shifts as might be necessary based on the changing/current conditions (step 1317).

Figure 14:
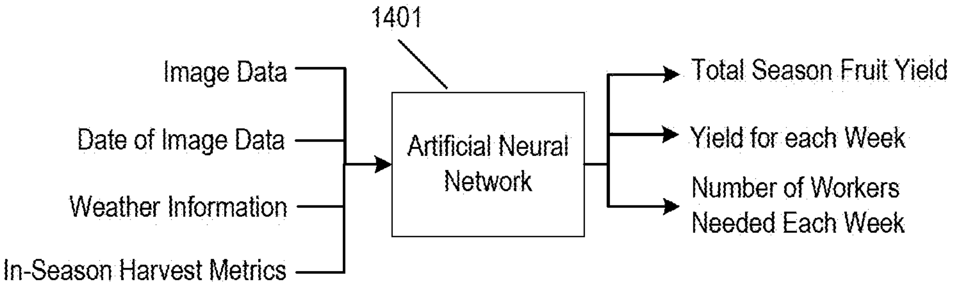
FIG. 14 is a block diagram of an example of an artificial neural network for use in performing the method of FIG. 13.

FIG. 14 illustrates an example of an AI mechanism that may be trained to determine estimated workforce needs based on collected and aggregated metrics/data for use in the method of FIG. 13. In this example an artificial neural network 1401 is trained to receive as input (i) image data indicative of the current state of the trees in the orchard (e.g., image data collected by the exterior camera system 213 of the harvesting cart(s) 100)), (ii) a date associated with the collected image data, (iii) weather information (including current weather, predicted future weather, and observed actual weather for previous days/weeks/months), and (iv) one or more quantified in-season harvest metrics (e.g., yield maps, fruit ripeness maps, and/or "missed" fruit map). In response to receiving this input data, the artificial neural network 1401 is configured to produce as output (i) an estimate of total season fruit yield, (ii) an estimate yield for each upcoming week of the harvest season, and (iii) a number of workers need for each week. As actual orchard yield metrics and actual workforce requirement numbers are determined throughout the harvest season, the artificial neural network 1401 is retrained to associate the input data that was used to provide the estimates with the actual metrics.

FIG. 14 provides just one example of an artificial neural network that can be used to estimate orchard yields and workforce needs based, at least in part, on data collected by the harvesting cart(s) 100 in previous years and throughout an ongoing harvesting season. Other implementations may utilize differently trained/configured AI mechanisms that will, for example, receive more, fewer, or different inputs and produce more, fewer, or different output in response.

Although the examples describes above discuss various operations performed by different system components (e.g., the harvesting cart control system 201, the remote computer/server 219), in various different implementations, the specific computations, image processing, data analysis, and other functions may be performed by different computing systems and/or may be distributed across multiple different computing devices. For example, in the discussion of the method of FIG. 3 provided above, the harvesting cart control system 201 is described as performing the image processing and analysis to detect trees in the exterior image data and to evaluate the fruit quality (e.g., readiness for harvesting). However, in some other implementations, the harvesting cart control system 201 may instead be configured to transmit image data from the harvesting cart 100 to the remote computer/server 219 and the remote computer/server 219 is configured to perform the image processing and analysis.

Similarly, in some of the example described above, the remote computer/server 219 is described as generating the yield maps (or other graphical reports based on data collected by the harvesting cart(s) 100). However, in some other implementations, the harvesting cart control system 201 is configured to generate the graphical map reports based on data collected by the harvesting cart 100 and to then either display the information locally or transmit the summary report/map to other systems.

In various implementations, the data collected by the harvesting cart can be used to calculate other metrics including, for example, an average speed of movement of the harvesting cart through the orchard or an average harvesting speed (i.e. fruit items harvested per hour or trees harvested per hour). Runtime total harvested product quantity can be viewed by an operator (e.g., the farmer/manager) based on the collected/aggregated data from the harvesting carts operating in the field to make sure logistical arrangements are being met. For example, based on the current harvesting velocity (e.g., fruit items collected per hour) and the remaining area of the field that will be harvested during the remainder of a particular day, the remote computer/server in some implementations will calculate an estimated total harvest for the day an automatically initiate arrangements with a transportation contractor to ensure that the entire harvest for the day can be collected and shipped from the orchard.

Also, the wireless communication capabilities discussed above can be adapted for other functionality in addition to or instead of those discussed in the examples above. For example, in some implementations, the harvesting cart control system 201 may be configured to determine (based, for example of in the output of the load cell and/or the interior image data) when the receptacle of the harvesting cart is nearly full and to automatically transmit a signal to the remote computer/server (including an indication of the current geospatial location of the nearly full harvesting cart) to initiate transportation of the full cart to the processing location (e.g., dispatching a vehicle to retrieve the cart & replace it with an empty cart or to empty the harvesting cart at its current geospatial location in the field).

Accordingly, the invention provides, among other things, systems and methods for detecting, tracking, and quantifying orchard harvest and yield metric using one or more harvesting carts equipped with a position determining unit, one or more cameras, and a load sensor configured to monitor a weight of contents in a receptacle of the harvesting cart. Various other features and advantages of this invention are set forth in the accompanying claims.

What is claimed is:

1. An orchard harvesting cart system comprising:

a mobile receptacle configured to receive a plurality of harvested fruit items as the mobile receptacle is moved through an orchard;

a position determining system configured to generate a position output signal indicative of a geospatial position of the mobile receptacle;

a load sensor coupled to the mobile receptacle and configured to generate a load output signal indicative of a weight of fruit items inside the mobile receptacle, wherein the load sensor is configured to adjust the load output signal in response to the addition of each fruit item to the receptacle;

at least one camera coupled to the mobile receptacle; and an electronic controller configured to apply image processing to image data captured by the at least one camera to quantify at least one characteristic of at least one fruit item in the field of view of the at least one camera, and track a total number of fruit items added to the receptacle based at least in part on a number of changes in the load output signal of the load sensor.

2. An orchard harvesting cart system comprising:

an orchard harvesting cart including a receptacle configured to receive a plurality of harvested fruit items as the orchard harvesting cart is moved through an orchard, a position determining system configured to generate a position output signal indicative of a geospatial position of the orchard harvesting cart, a load sensor coupled to the receptacle and configured to generate a load output signal indicative of a weight of fruit items inside the receptacle, and an interior camera positioned with a field of view including an interior of the receptacle; and an electronic controller configured to detect when at least one new fruit item is added to the receptacle based at least in part on the load output signal of the load sensor, analyze image data from the interior camera to evaluate a readiness for harvest of the at least one new fruit item, track a total number of fruit items added to the receptacle based at least in part on a number of changes in the load output signal of the load sensor, wherein the load sensor is configured to adjust the load output signal in response to the addition of each fruit item to the receptacle, and track a total number of prematurely harvested fruit items added to the receptacle.

3. The orchard harvesting system of claim 2, wherein the electronic controller is further configured to analyze the image data from the interior camera to evaluate a readiness for harvest of the at least one new fruit item by evaluating a color of the at least one new fruit item.

4. The orchard harvesting system of claim 2, wherein the electronic controller is further configured to identify a worker operating the harvesting cart, and evaluate an efficiency of the identified worker by aggregating data collected by the orchard harvesting cart and previously stored data for the identified worker.

5. The orchard harvesting system of claim 4, wherein the electronic controller is configured to evaluate the efficiency of the identified worker by calculating at least one selected from a group consisting of an average harvesting rate of fruit items as a function of time, and a rate of prematurely harvested fruit items added to the receptacle as a function of total fruit items added to the receptacle.

6. The orchard harvesting system of claim 2, wherein the electronic controller is further configured to:

identify a sub-area of the orchard based on a current geospatial position of the orchard harvesting cart, track a number of fruit items added to the receptacle while the current geospatial position of the orchard harvesting cart is within the identified sub-area of the orchard, and generate a yield map indicating a total number of fruit items harvested from each sub-area of the orchard.

7. The orchard harvesting system of claim 6, wherein the electronic controller is further configured to store data indicating a number of fruit items added to the receptacle for each sub-area of the orchard and during each of a plurality of defined time periods, and wherein the electronic controller is configured to generate the yield map by aggregating data collected by one or more orchard harvesting carts over multiple different defined time periods, and generating a yield map indicating a total number of fruit items harvested from each sub-area of the orchard during each of the plurality of defined periods of time.

8. The orchard harvesting system of claim 2, wherein the electronic controller is further configured to:

identify a sub-area of the orchard based on a current geospatial position of the orchard harvesting cart, track a number of the prematurely harvested fruit items added to the receptacle while the current geospatial position of the orchard harvesting cart is within the identified sub-area of the orchard, and generate a map indicating a total number of prematurely harvested fruit items harvested from each sub-area of the orchard.

9. The orchard harvesting system of claim 2, wherein the orchard harvesting cart further includes at least one exterior camera, and wherein the electronic controller is further configured to:

analyze image data captured by the at least one exterior camera to detect unharvested fruit items that are ready for harvesting, and determine a geospatial location of the unharvested fruit items that are ready for harvesting based on the positional output signal from the position determining system when the image data is captured by the at least one exterior camera.

10. The orchard harvesting system of claim 9, wherein the electronic controller is further configured to determining an identity of a worker operating the orchard harvesting cart, and generate an output report identifying the geospatial location of the unharvested fruit items that are ready for harvesting and the identity of the worker that failed to harvest the unharvested fruit items that are ready for harvesting.

11. The orchard harvesting system of claim 2, wherein the electronic controller is further configured to:

aggregate data collected by a plurality of orchard harvesting carts over a plurality of different defined periods of time, and calculate a predicted yield for each of a plurality of upcoming defined periods of time based on the aggregated data.

12. The orchard harvesting system of claim 11, wherein the electronic controller is further configured to automatically predict workforce needs for each of the plurality of upcoming defined periods of time based on the calculated predicted yield.

13. The orchard harvesting system of claim 2, wherein the electronic controller is further configured to:

determine a current time when the at least one new fruit item is added to the receptacle, determine the current time when the at least one new fruit item is unloaded from the receptacle, aggregate data collected by a plurality of orchard harvesting carts over a plurality of different defined period of time, and calculate, based on the aggregated data, an average amount of time that fruit items remain in the receptacle based on at least one selected from a group consisting of:

a geospatial location in the orchard where the fruit item is harvested, and an identity of the worker operating the orchard harvesting cart.

14. The orchard harvesting cart system of claim 2, wherein the position determining system includes a global positioning system.

15. A method for monitoring orchard worker efficiency, the method comprising:

detecting when at least one new fruit item is added to a receptacle of an orchard harvesting cart based on a load output signal from a load sensor, wherein the load sensor is coupled to the receptacle and configured to generate the load output signal indicative of a weight of fruit items inside the receptacle;

receiving image data captured by an interior camera of the orchard harvesting cart, wherein the interior camera is positioned with a field of view including an interior of the receptacle;

analyzing the image data to evaluate a readiness for harvest of the at least one new fruit item;

tracking a total number of fruit items added to the receptacle based at least in part on a number of changes in the load output signal of the load sensor, wherein the load sensor is configured to adjust the load output signal in response to the addition of each fruit item to the receptacle; and tracking a total number of prematurely harvested fruit items added to the receptacle.

* * * * *